US007567058B2

(12) United States Patent
Shimizu et al.

(10) Patent No.: US 7,567,058 B2

(45) Date of Patent: Jul. 28, 2009

(54) POWER TOOL HAVING A MAIN BODY AND A BATTERY PACK DETACHABLY ATTACHED TO THE MAIN BODY

(75) Inventors: Hidenori Shimizu, Osaka (JP); Fumiaki Sawano, Osaka (JP); Masatoshi Atsumi, Osaka (JP)

(73) Assignee: Matsushita Electric Works, Ltd., Osaka (JP)

( * ) Notice: Subject to any disclaimer, the term of this patent is extended or adjusted under 35 U.S.C. 154(b) by 54 days.

(21) Appl. No.: 11/441,017

(22) Filed: May 26, 2006

(65) Prior Publication Data

US 2006/0268504 A1 Nov. 30, 2006

(30) Foreign Application Priority Data

May 26, 2005 (JP) ............................ 2005-154686

(51) Int. Cl.
*H02J 7/00* (2006.01)

(52) U.S. Cl. ....................... 320/114; 320/106; 320/107; 320/112; 439/352

(58) Field of Classification Search ................. 320/106, 320/107, 112–115; 310/50; 439/155, 287, 439/352, 341, 929, 500

See application file for complete search history.

(56) References Cited

U.S. PATENT DOCUMENTS

| | | | | |
|---|---|---|---|---|
| 6,018,227 | A * | 1/2000 | Kumar et al. | 320/106 |
| 6,181,032 | B1 * | 1/2001 | Marshall et al. | 307/150 |
| 6,350,149 | B1 * | 2/2002 | Nakane | 439/500 |
| 6,502,949 | B1 * | 1/2003 | Horiyama et al. | 362/119 |
| 6,521,370 | B1 * | 2/2003 | Takeshita et al. | 429/96 |
| 6,656,626 | B1 * | 12/2003 | Mooty et al. | 429/99 |
| 7,064,520 | B2 * | 6/2006 | Heigl et al. | 320/114 |
| 7,186,117 | B2 * | 3/2007 | Chen | 439/11 |
| 7,253,585 | B2 * | 8/2007 | Johnson et al. | 320/112 |
| 2003/0102844 | A1 * | 6/2003 | Bailey | 320/114 |
| 2003/0203669 | A1 * | 10/2003 | Glauning | 439/500 |
| 2004/0095094 | A1 * | 5/2004 | Kubale et al. | 320/114 |
| 2004/0242042 | A1 | 12/2004 | Buck et al. | |
| 2005/0200330 | A1 * | 9/2005 | Ahn et al. | 320/112 |
| 2005/0280393 | A1 * | 12/2005 | Feldmann | 320/114 |

* cited by examiner

*Primary Examiner*—Akm E Ullah
*Assistant Examiner*—Arun Williams
(74) *Attorney, Agent, or Firm*—Bacon & Thomas, PLLC

(57) ABSTRACT

A power tool includes a power tool and a battery pack detachably attached to the power tool, the battery pack having two engaging portions to be mechanically coupled to the power tool and the power tool having engaged portions respectively corresponding to two engaging portions of the battery pack respectively. Each of engaging portions of the battery pack includes an insertion restricting portion and an attachment securing portion for allowing its corresponding engaged portion to be inserted only in a direction of pressing the attaching portion of the battery pack against the attached portion of the power tool, each of the attachment securing portions being coupled to its corresponding engaged portion. At least one of said at least two engaging portions further has a hook engaging portion which is selectively secured with an engaged portion moved from its corresponding insertion restricting portion to its corresponding attachment securing portion.

7 Claims, 12 Drawing Sheets

POWER TOOL HAVING A MAIN BODY AND A BATTERY PACK DETACHABLY ATTACHED TO THE MAIN BODY

FIELD OF THE INVENTION

The present invention relates to a power tool; and, more particularly, to a technique for detachably attaching a battery pack to a power tool main body.

BACKGROUND OF THE INVENTION

As for a conventional power tool, there is known one including a power tool main body and a battery pack for accommodating therein a storage battery. The battery pack has a case provided with a positive and a negative charging/discharging terminals and a right and a left slide rails. The power tool main body has a housing provided with a positive and a negative power supply terminals and a pair of guide rails capable of slidably supporting the right and the left slide rails (see, e.g., Japanese Patent Laid-open Application No. 2001-143678).

The battery pack is attached to the power tool, as disclosed in Japanese Patent Laid-open Application No. 2001-143678, by first sliding the slide rails of the battery pack slide into the guide rails of the power tool main body to thereby electrically connect the positive and the negative charging/discharging terminals and the positive and the negative power supply terminals, followed by respective coupling of the slide rails of the battery pack with their corresponding guide rails of the power tool main body.

Since the prior art requires the slide coupling between the slide rails and the guide rails, requiring the parts involved to move a relatively large distance, it is difficult and inconvenient to perform the attachment/detachment in a limited space. Moreover, if, by chance, the battery pack is separated using an excessive separation force, other members may get damaged by a contact with the battery pack. Furthermore, the battery pack may get attached improperly, or a battery pack of a different voltage may mistakenly get attached. In addition, during the state at which the battery pack is not being used, terminals or connecter signal lines may become short-circuited.

SUMMARY OF THE INVENTION

It is, therefore, an object of the present invention to provide a power tool capable of: easily attaching a battery pack to a power tool main body with one-touch operation; enabling an attachment/detachment in a limited space by reducing a distance required to move for the attachment/detachment, compared to the conventional case requiring a slide insertion operation between slide rails and guide rails; preventing other members from being damaged when an excessive separation force is applied during the detachment of the battery pack from the power tool main body; and avoiding an improper attachment of the battery pack, a battery pack having a different voltage and a possibility of terminals or connector signal lines being short-circuited when the battery pack is not in use.

In accordance with the present invention, there is provided A power tool including: a power tool main body having a motor, a reduction unit and an output unit; and a battery pack for accommodating therein a battery, the battery pack being detachably attached to the power tool main body, wherein the battery pack is provided with an attaching portion having a positive and negative terminal for connecting a power supply to the power tool main body and at least two engaging portions to be mechanically coupled to the power tool main body, wherein the power tool main body is provided with an attached portion having engaged portions respectively corresponding to said at least two engaging portions of the battery pack respectively, wherein each of engaging portions of the battery pack includes an insertion restricting portion and an attachment securing portion for allowing its corresponding engaged portion to be inserted only in a direction of pressing the attaching portion of the battery pack against the attached portion of the power tool main body, each of the attachment securing portions being coupled to its corresponding engaged portion, and wherein at least one of said at least two engaging portions further has a hook engaging portion which is selectively secured with an engaged portion moved from an insertion restricting portion of said at least one engaging portion to an attachment securing portion thereof.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENT

Hereinafter, preferred embodiments of the present invention will be described in detail with reference to the accompanying drawings.

Figure 1:
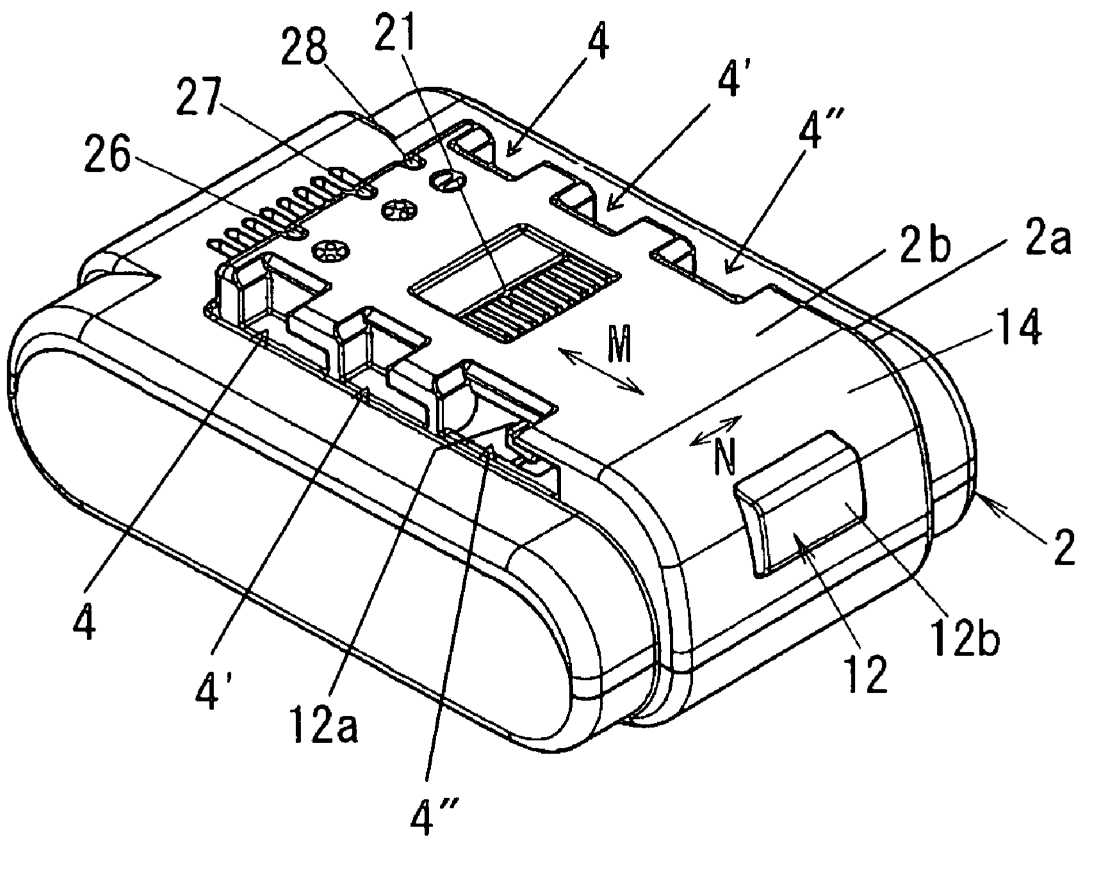
FIG. 1 is a perspective view of a battery pack in accordance with a first preferred embodiment of the present invention.
Figure 2:
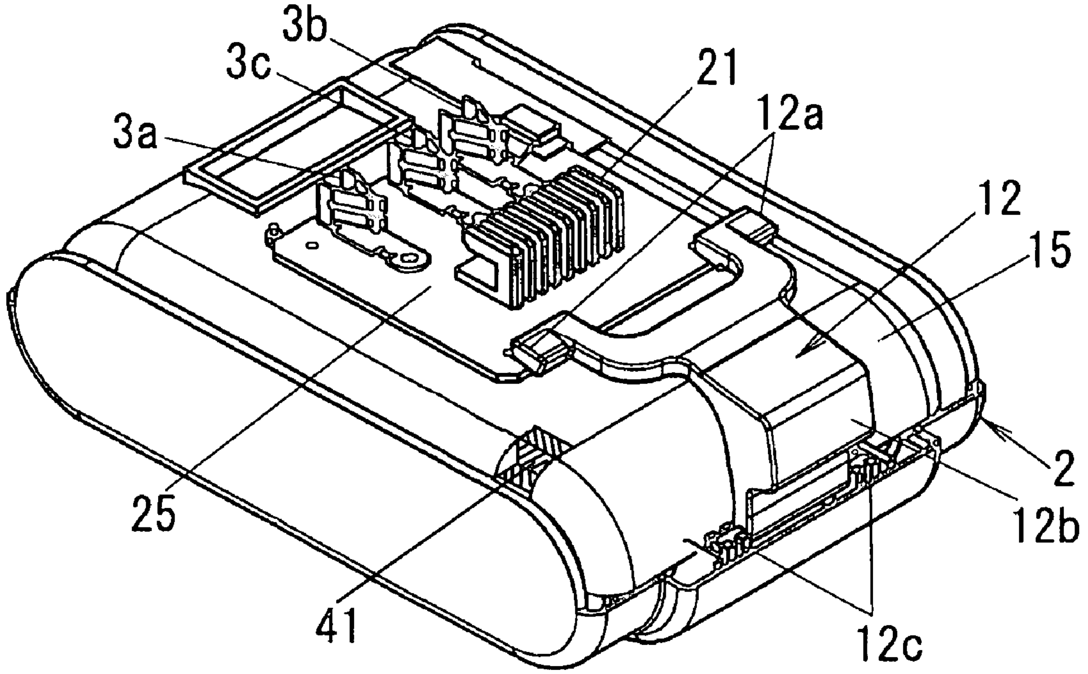
FIG. 2 shows a perspective view of the battery pack after an outer case thereof has been removed.
Figure 3:
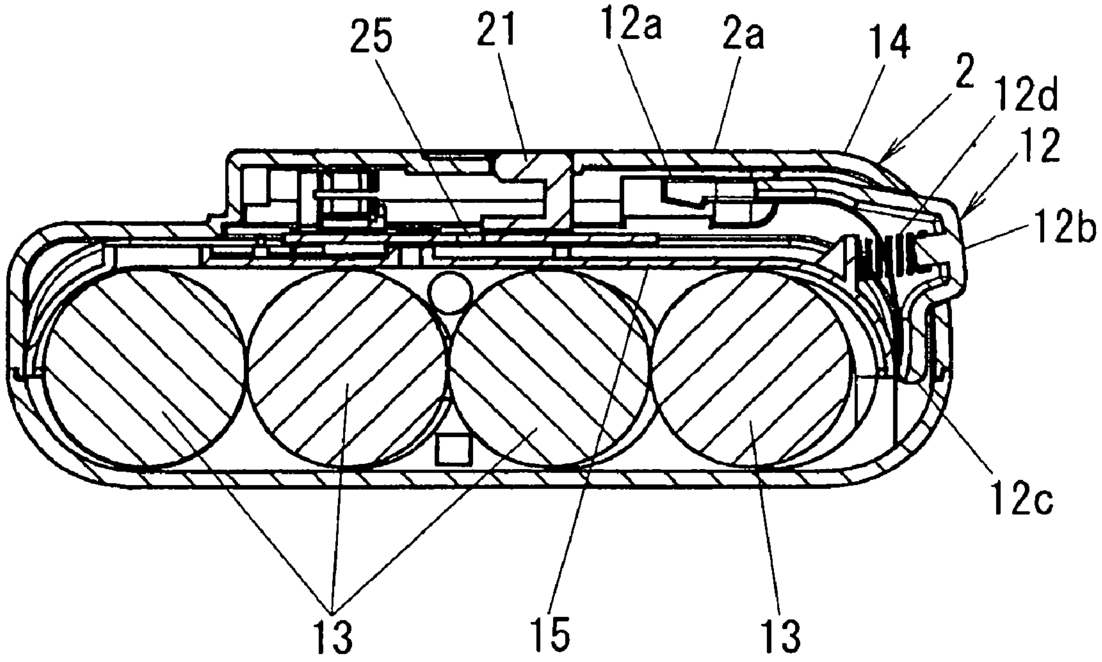
FIG. 3 illustrates a cross sectional view of the battery pack.

FIG. 1 shows a perspective view of a battery pack 2 in accordance with a first preferred embodiment of the present invention; FIG. 2 describes a perspective view of the battery pack 2 after an outer case thereof has been removed; and FIG. 3 provides a cross sectional view of the battery pack 2 shown in FIG. 1.

A power tool in accordance with a first preferred embodiment of the present includes a power tool main body 1 (see FIG. 5A) such as an impact driver or the like and a battery pack 2 detachably attached to the power tool main body 1.

The battery pack 2 is a box body accommodating therein a plurality of storage batteries (hereinafter, referred to as "cells 13") connected by interconnection plates. In this embodiment, the box body has a double structure in which an outer case 14 accommodates therein a comparatively smaller inner case 15 for covering the cells 13. The outer case 14 is configured by assembling an upper case and a lower case, wherein the upper case has an attaching portion 2*a* to be commonly attached to a battery charger and the power tool main body 1.

Figure 5A:
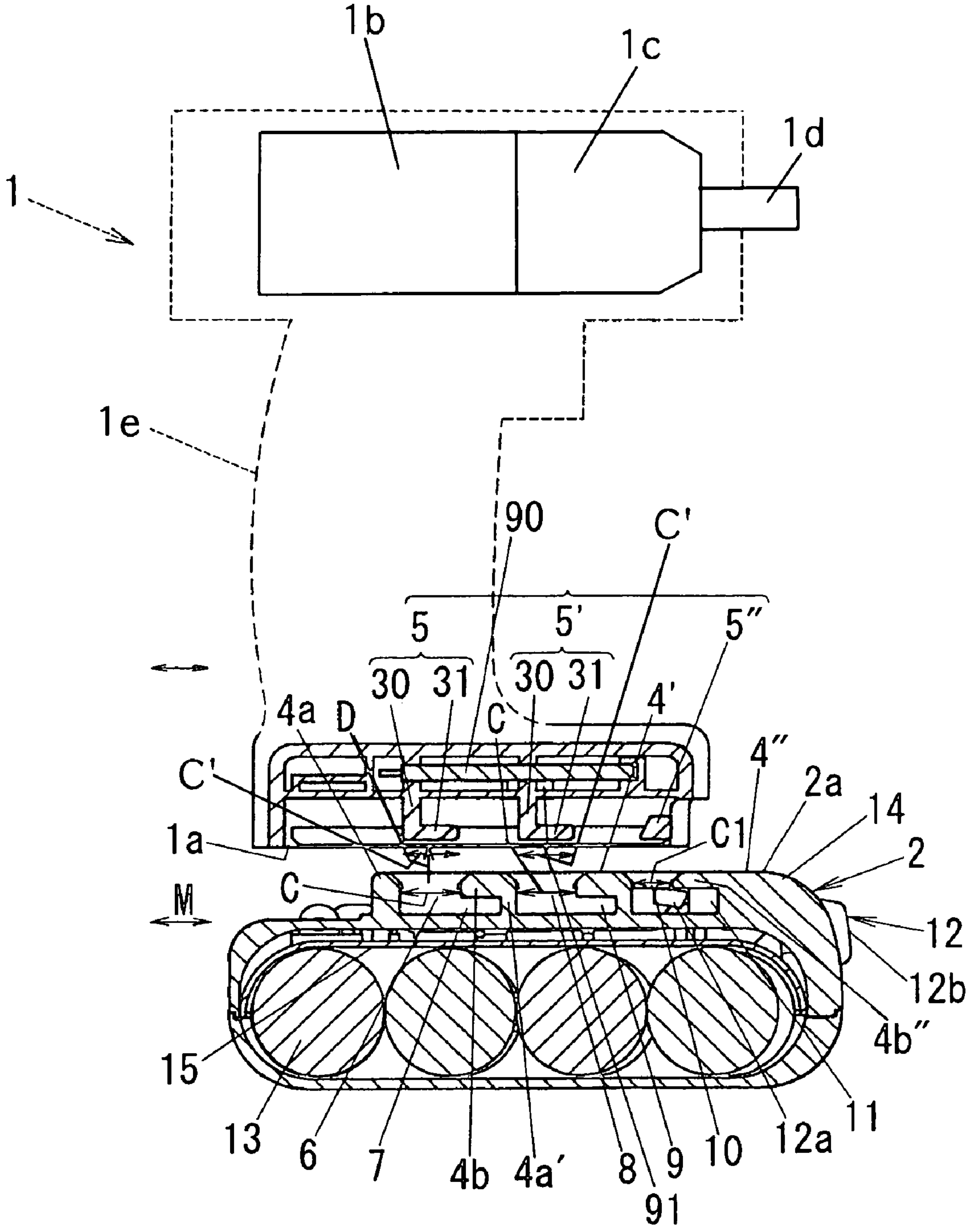
FIGS. 5A and 5B provide a view depicting a state where the battery pack is not connected to a power tool main body and a cross sectional view setting forth engaging portions of the battery pack, respectively.
Figure 5B:
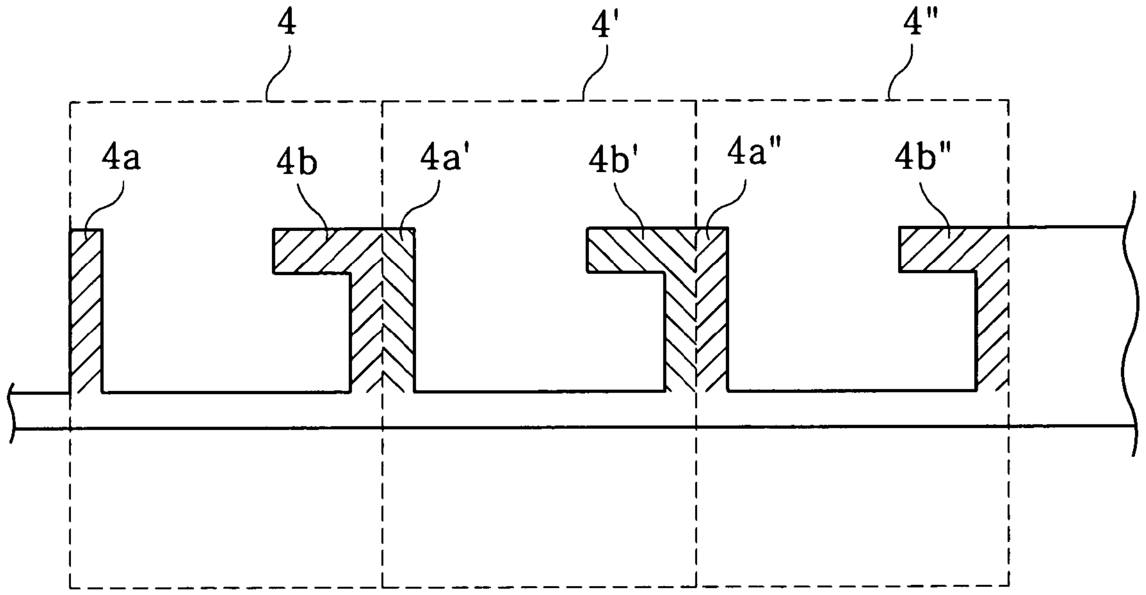

The outer case 14 is of an approximately rectangular shape when seen from the top. Provided at the attaching portion 2*a* of the upper case are at least two engaging portions to be mechanically coupled to the power tool main body 1. In this embodiment, for example, three engaging portions 4, 4' and 4" are respectively provided at two longitudinal sides of the attaching portion 2*a*. The engaging portions 4, 4' and 4" are vertically raised with respect to a main surface 2*b* of the attaching portion 2*a*. As shown in FIG. 5B, the engaging portions 4, 4', 4" include insertion restricting portions 4*a*, 4*a'*, 4*a"* and L-shaped attachment securing portions 4*b*, 4*b'*, 4*b"* for allowing their corresponding engaged portions 5, 5', 5" to be inserted only in a direction of pressing the attaching portion 2*a* of the battery pack 2 against the attached portion 1*a* of the power tool main body 1, as described later. The attachment securing portions 4*b*, 4*b'*, 4*b"* are engaged with their corresponding engaged portions 5, 5', 5". The engaging portion 4" further has, e.g., two hook engaging portions 12*a* which are secured with the engaged portions 5" moved from the insertion restricting portions 4*a"* to the attachment securing portions 4*b"*. Moreover, as shown in FIG. 5A, a first vertical hole 6 and a first horizontal hole 7 extending therefrom are formed at an inner portion of the engaging portion 4; a second vertical hole 8 and a second horizontal hole 9 extending therefrom are formed at an inner portion of the engaging portion 4'; and a third vertical hole 10 and a third horizontal hole 11 extending therefrom are formed at an inner portion of the engaging portion 4". In a similar fashion, engaging portions are provided on the other longitudinal side of the attachment portion 2*a*. Accordingly, the engaging portions 4, 4', 4" will be described about one longitudinal side of the attachment portion 2*a*.

As illustrated in FIG. 3, a hook 12 is accommodated in a hollow space between the outer case 14 and the inner case 15 such that a part of the hook 12 can be protruded to outside of the outer case 14. Installed at a base end portion of a body of the hook 12 are two pivots 12*c* rotatably supported at coupling portions 81 (see FIG. 6A) between the upper case and the lower case of the outer case 14. Further, a manipulated part 12*b* exposed to outside of the outer case 14 is provided at a central portion of the hook 12. Meanwhile, a leading end portion of the hook 12 opposite to the base end portion thereof has a forked part whose leading two ends are respectively provided with hook engaging portions 12*a*. One of the hook engaging portions 12*a* is installed at the inner portion of the engaging portion 4" provided at one longitudinal side of the attaching portion 2*a*, whereas the other hook engaging portion 12*a* is installed at the inner portion of the engaging portion 4" provided at the other longitudinal side thereof.

The manipulated part 12*b* of the hook 12 is supported at the inner case 15 and a hook spring 12*d* formed of a compression coil spring is interposed therebetween. The hook engaging portions 12*a* are spring-pressed by the hook spring 12*d* in a direction toward an inner surface of the outer case 14 (in an upward direction of FIG. 5A). Accordingly, parts of the hook engaging portions 12*a* are elastically contacted with horizontal inner surfaces of the attachment securing portions 4*b"* of the engaging portions 4". Moreover, when the manipulated part 12*b* is pressed by hand, or when the hook engaging portions 12*a* are pressed by protruding engaged portions 5" of the power tool main body 1 to be described later, the hook 12 pivots in a direction away from the inner surface of the outer case 14 (in a downward direction of FIG. 5A) against a bias force of the hook spring 12*d*. Accordingly, top surfaces of the hook engaging portions 12*a* move slightly lower than horizontal level of horizontal inner surfaces of the attachment securing portions 4*b"* (the state of FIG. 6A), allowing the protruding engaged portions 5" and the engaging portions 4" to be engaged with each other.

Since the hook engaging portion 12*a* is not provided at the inner portions of the engaging portions 4 and 4', the engaging portions 4 and 4' can be freely engaged with or separated from the L-shaped engaged portions 5 and 5' of the power tool main body 1 without being restricted by the hook 12.

Figure 4:
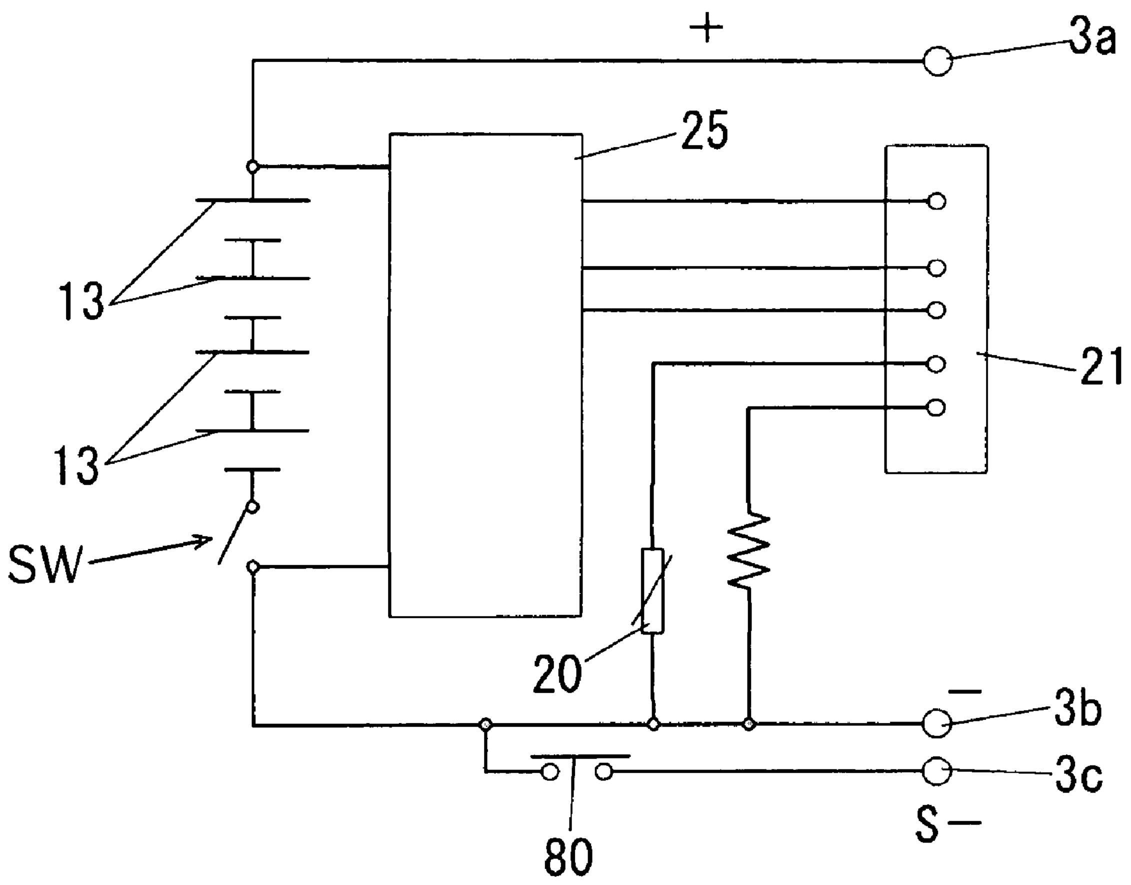
FIG. 4 describes a circuit diagram of a printed circuit board of the battery pack.

As illustrated in FIG. 1, the attaching portion 2*a* of the outer case 14 is provided with three recesses 26 to 28 into which charging/discharging male terminals for an electrical connection are inserted respectively. Provided inside the three recesses 26 to 28 are three female terminals mounted on the printed circuit board 25 fixed to the inner case 15 shown in FIG. 2. The three female terminals form a positive and a negative charging/discharging terminal 3*a* and 3*b* and a temperature terminal 3*c* connected to a thermo switch 80. Moreover, the three female terminals (a positive and a negative power supply terminal and a temperature signal detection terminal) are configured in such a way that the terminals 3*a*, 3*b* and 3*c* can be respectively inserted thereinto through the three recesses 26 to 28. FIG. 4 shows an exemplary circuit diagram of the printed circuit board 25 attached to the inner case 15. Referring to FIG. 4, there are illustrated reference numerals 20 and 21 representing a temperature detecting thermister and a connector, respectively. In this embodiment, a positive terminal of one of the cells 13 is connected to the positive charging/discharging terminal 3*a* and the printed circuit board 25, whereas a negative terminal of the other cell 13 is connected to the negative charging/discharging terminal 3*b* and the printed circuit board 25 via a switch SW to be described later. The connector 21 outputs a voltage signal from the printed circuit board 25, a temperature signal from the thermister 20 or the like, or form a communication circuit between itself as a communication terminal and a battery charger.

Meanwhile, the power tool main body 1 includes a motor 1*b*, a reduction unit 1*c* and an output unit 1*d*, as illustrated in FIG. 5A. A bottom surface of a handle portion 1*e* of the power tool main body 1 serves as an attached portion 1*a* to which the battery pack 2 is attached. Installed at the attached portion 1*a* is a main body control circuit 90 having thereon a signal connector 91. Further, engaged portions 5, 5' and 5" are respectively provided at both sides of the attached portion 1*a* to correspond to the engaging portions 4, 4' and 4" provided at both sides of the attaching portion 2*a* of the battery pack 2. Specifically, L-shaped engaged portions 5 and 5" correspond to the engaging portions 4 and 4' of the battery pack 2 respectively and a protruding engaged portion 5" corresponds to the engaging portion 4". Each of the L-shaped engaged portions 5 and 5' has a vertical rib 30 and a horizontal rib 31 to be engageable with the engaging portions 4 and 4" of the battery pack 2.

Moreover, a horizontal width C of the first vertical hole 6 of the battery pack 2 is equal to a horizontal width C of the second vertical hole 8, as illustrated in FIG. 5A. According to such horizontal width C, horizontal widths C' of the L-shaped engaged portion 5 and 5' are set. In other words, the horizontal width C' is set to be slightly smaller than the horizontal width C. Further, a horizontal width C1 of the third vertical hole 10 of the battery pack 2 is set to be smaller than the aforementioned horizontal width C, and according thereto, a horizontal distance of the protruding engaged portion 5" of the power tool main body 1 is set. Accordingly, the L-shaped engaged portions 5 and 5' of the power tool main body 1 can not be inserted into the third vertical hole 10 of the battery pack 2, thereby preventing misengagement between the engaged portions 5, 5', 5" of the power tool main body 1 and the engaging portions 4, 4', 4" of the battery pack 2. That is, since the horizontal distances C' of the L-shaped engaged portions 5 and 5' are greater than the horizontal width C1 of the third vertical hole 10 of the batter pack 2, the L-shaped engaged portions 5 and 5' can not be inserted into the third vertical hole 10 of the battery pack 2.

Figure 6A:
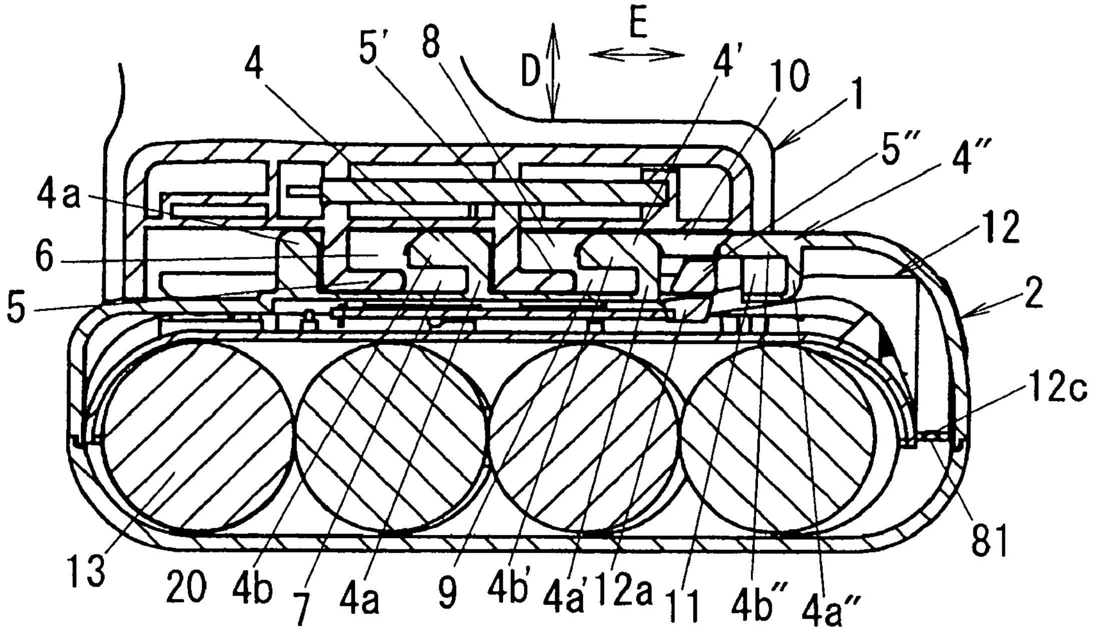
FIGS. 6A and 6B present cross sectional views setting forth an attachment operation between the battery pack and the power tool main body.
Figure 6B:
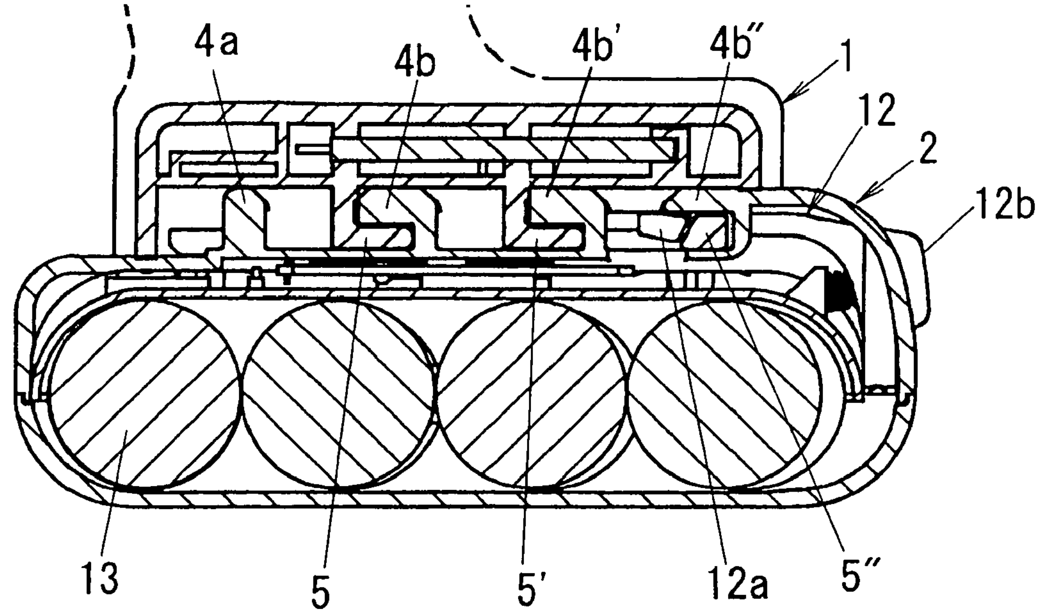

Hereinafter, an attachment sequence will be described with reference to FIGS. 6A and 6B illustrating the sequence of attaching the battery pack 2 to the power tool main body 1.

Before the attachment, as shown in FIG. 5A, the hook engaging portion 12*a* is elastically in contact with the horizontal inner surface of the engaging portion 4" and, also, a part thereof is exposed through the third vertical holes 10. When the attaching portion 2*a* of the battery pack 2 gets attached to the attached portion 1*a* of the power tool main body 1 in a direction D of pressing each other, the engaged portions 5, 5' and 5" of the power tool main body 1 become inserted into the engaging portions 4, 4' and 4" of the battery pack 2 through the first to the third vertical holes 6, 8, 10, respectively, as depicted in FIG. 6A. At this time, since the hook engaging portion 12*a* is pressed downward by the protruding engaged portion 5", the hook 12 rotates downward in an arc shape centering on the pivots 12*c*, and, accordingly, the top surface of the protruding engaged portion 5" moves slight lower than a horizontal level of the horizontal inner surface of the attachment securing portions 4*b*" (the state of FIG. 6A). In such state, if either the power tool main body 1 or the battery pack 2 is shifted toward a direction E perpendicular to the pressing direction D, the engaged portion 5, 5' and 5" become inserted into the first to the third horizontal holes 7, 9 and 11 to be coupled to the attachment securing portions 4*b*, 4*b*' and 4*b*", respectively, as illustrated in FIG. 6B. At this time, since the pressing force applied from the protruding engaged portion 5" to the hook engaging portion 12*a* is released, the hook engaging portion 12*a* returns to original position by a bias force of the hook spring 12*d* (the state of FIG. 6B). Consequently, the protruding engaged portion 5" is engaged with the hook engaging portions 12*a* and thus prevented from being separated from the third horizontal hole 10. In this state, the attachment of the engaged portions 5, 5' and 5" is maintained by the respective attachment securing portions 4*b*, 4*b*' and 4*b*", resulting in a firm coupling between the battery pack 2 and the power tool main body 1.

In order to separate the battery pack 2, the manipulated part 12*b* of the hook 12 needs to be pushed by, e.g., a finger from the outside. In such a situation, the hook 12 rotates downward in an arc shape centering on the pivots 12*c*, which, in turn, forces the top surface of the hook engaging portion 12*a* to move slightly lower than a horizontal level of the bottom surface of the protruding engaged portion 5" (the state of FIG. 6A). In such state, by shifting either the power tool main body 1 or the battery pack 2, the battery pack 2 can be separated from the power tool main body 1.

As explained over, the batter pack 2 can be attached only by pressing the attaching portion 2*a* of the battery pack 2 against the attached portion 1*a* of the power tool main body 1 and then horizontally shifting either the power tool main body 1 or the battery pack 2. Therefore, in comparison with the conventional case requiring the slide insertion operation between the slide rails and the guide rails, a distance the members involved are required to move for the attachment is small and, thus, the battery pack 2 can be easily attached/detached in a limited space. Further, it is possible to prevent other members from being damaged when an excessive separation force is exerted during the separation of the battery pack from the power tool main body 1. In addition, since the three pairs of engaging portions 4, 4' and 4" are provided at both sides of the attaching portion 2*a*, the battery pack 2 can be firmly coupled. Moreover, when the manipulated part 12*b* is manipulated, the engagement between the hook engaging portions 12*a* and the engaged portions 5" is released by the rotation of the hook 2, thereby enabling to simply separate the battery pack 2 from the power tool main body 1.

In accordance with this embodiment, a firm coupling state of the protruding engaged portion 5" can be maintained by the bias force of the hook engaging portions 12*a*, allowing the battery pack 2 to be firmly engaged to the power tool main body 1. Moreover, when the hook engaging portions 12*a* return to the original positions due to the bias force of the hook spring 12*d* in a state where the engaged portions 5" are held by the attachment securing portions 4*b*", a click sound is generated by the contact between the horizontal inner surface of the attachment securing portions 4*b*" and the hook engaging portions 12*a*, allowing a user to check whether or not the battery pack 2 has been firmly attached.

Figure 7:
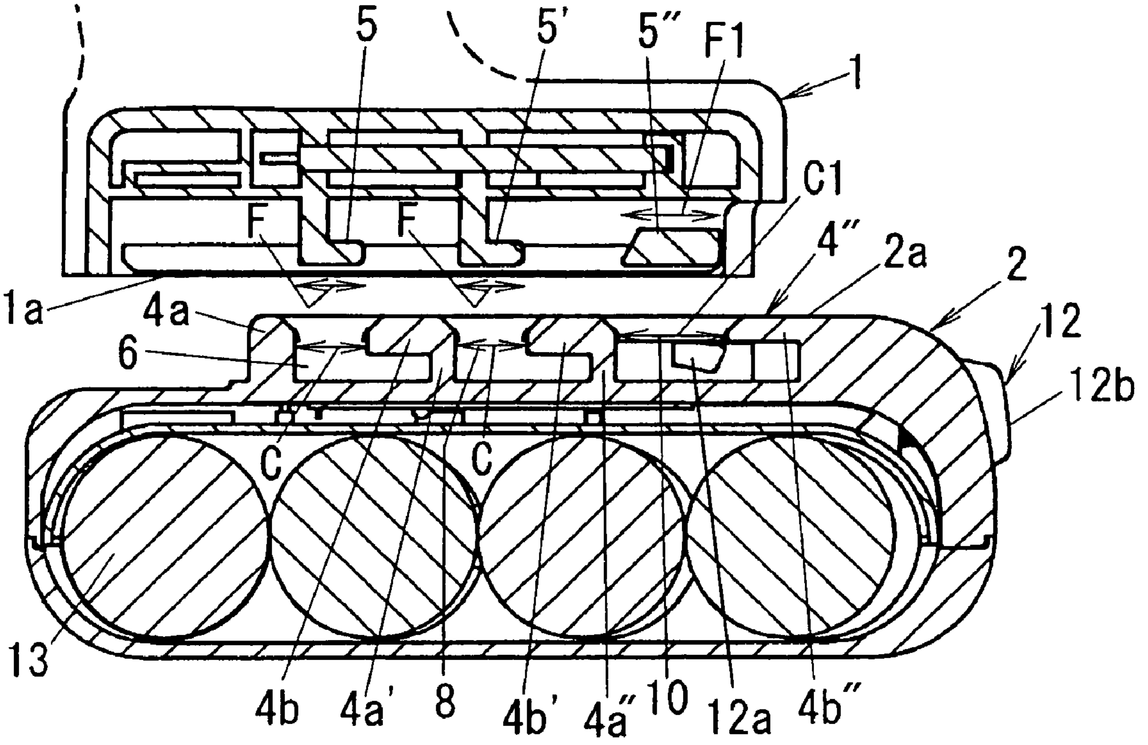
FIG. 7 represents a cross section view setting forth an attachment operation between another battery pack and another power tool main body in accordance with a second preferred embodiment of the present invention.

Hereinafter, a second preferred embodiment of the present invention will be described. As illustrated in FIG. 7, horizontal distances F of the L-shaped engaged portions 5 and 5' of the power tool main body 1 are set differently from a horizontal distance F1 of the protruding engaged portions 5" (i.e., F1>F). Depending on this design, the horizontal width C of the first and the second vertical hole 6 and 8 of the battery pack 2 are set to be different from the horizontal width C1 of the third vertical hole 10 (i.e., C1>C). Accordingly, the protruding engaged portions 5" can be inserted only into the third vertical holes 10, thereby preventing an improper insertion. In other words, by enlarging the horizontal distance F1 of the protruding engaged portions 5" compared to the horizontal width C of the first and the second vertical hole 6 and 8, the protruding engaged portions 5" can be inserted only into the third vertical holes 10.

Figure 8A:
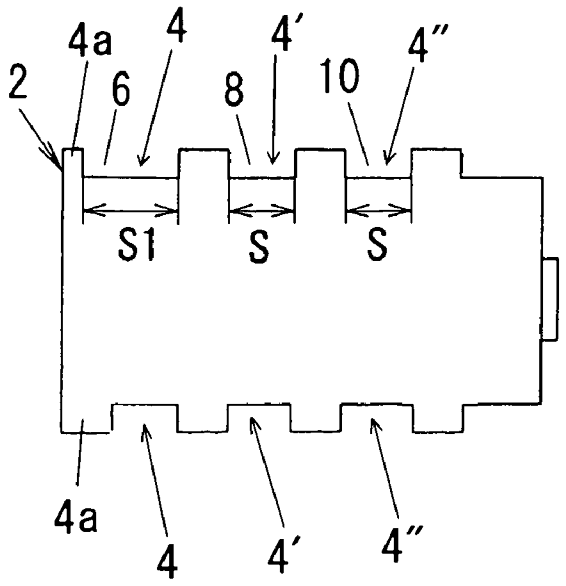
FIGS. 8A and 8B offer schematic views of still another battery pack and still another power tool main body in accordance with a third preferred embodiment of the present invention.
Figure 8B:
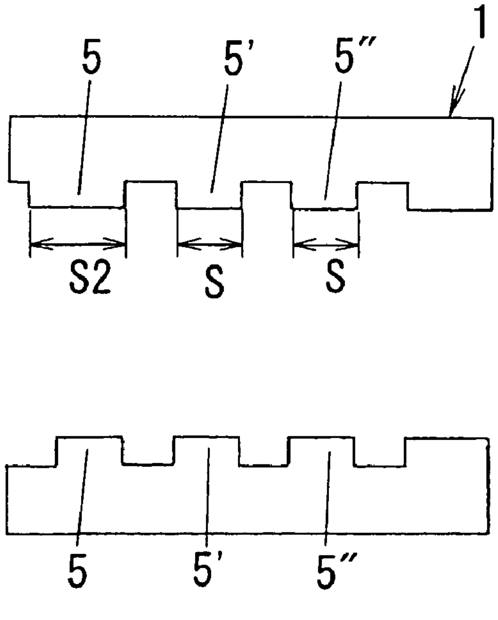
Figure 9:
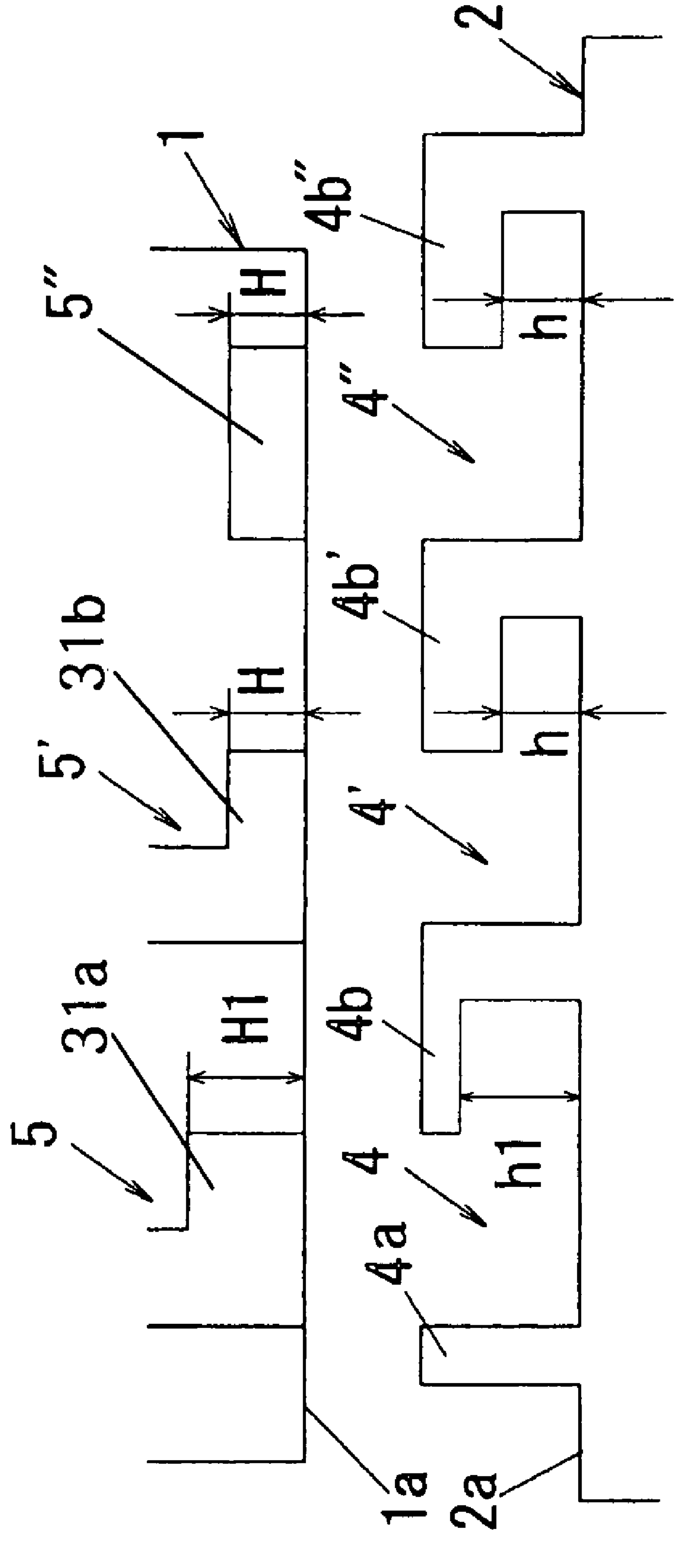
FIG. 9 is a schematic view of still another battery pack and still another power tool main body in accordance with a fourth preferred embodiment of the present invention.

FIGS. 8A, 8B and 9 illustrate a third and a fourth preferred embodiments capable of preventing the improper insertion. As shown in FIG. 8B, a horizontal distance S2 of the L-shaped engaged portions 5 of the power tool main body 1 is set differently from horizontal distances S of the engaged portions 5' and 5" (i.e., S<S2). Therefore, as shown in FIG. 8A, a horizontal width S1 of the first vertical holes 6 of the battery pack 2 is set differently from the horizontal widths S of the second and the third vertical hole 8 and 10 (i.e., S<S1). In the meantime, as illustrated in FIG. 9, a height H1 of a horizontal rib 31*a* of the L-shaped engaged portions 5 of the power tool main body 1 is set to be greater than heights H of a horizontal rib 31*b* of the engaged portions 5' and 5". Accordingly, the height H1 of the attachment securing portions 4*b* of the engaging portions 4 of the battery pack 2 is set to be greater than the vertical position h of the attachment securing portions $4b'$ and $4b''$ of the other engaging portion 4' and 4". In this manner, if the horizontal distance of the engaged portion and the horizontal width of the vertical holes, the horizontal distance of the horizontal rib and the protruding engaged portion, or the vertical position of the attachment securing portions are set differently, the improper insertion can be prevented. Especially, in case there are provided a plurality of battery packs 2 having different voltages, by differently setting the horizontal width dimensions or the vertical positions of the attachment securing portions 4*b*, $4b'$ and $4b''$ of the engaging portions 4, 4' and 4" depending on types of the battery packs 2, it is possible to prevent the improper insertion and ensure the safety.

Figure 10A:
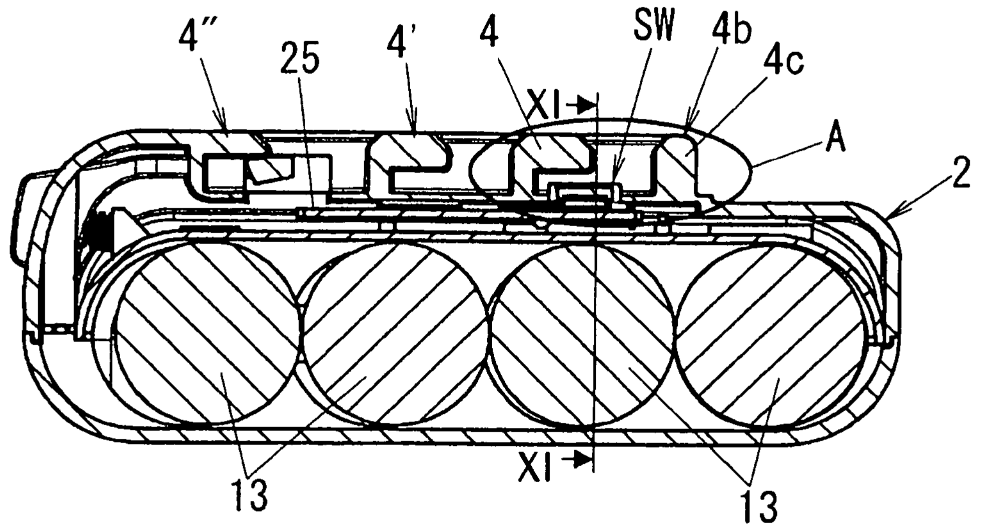
FIG. 10A provides a sectional view of still another battery pact in accordance with a fifth preferred embodiment.
Figure 10B:
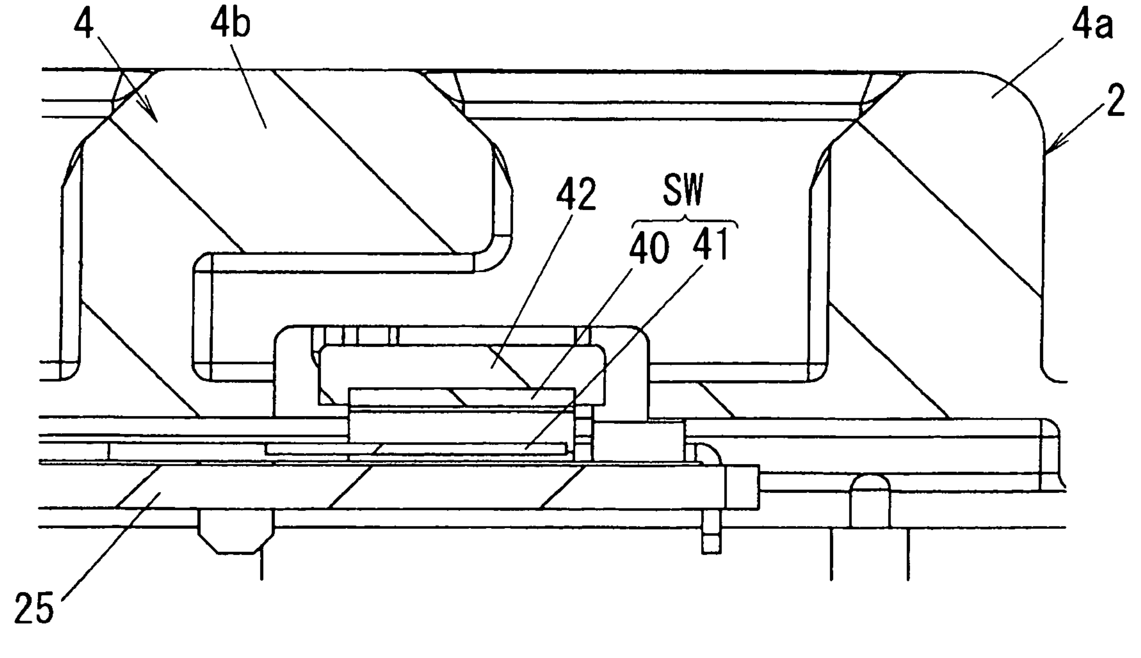
FIG. 10B illustrates an enlarged view of an "A" portion shown in FIG. 10A.
Figure 11:
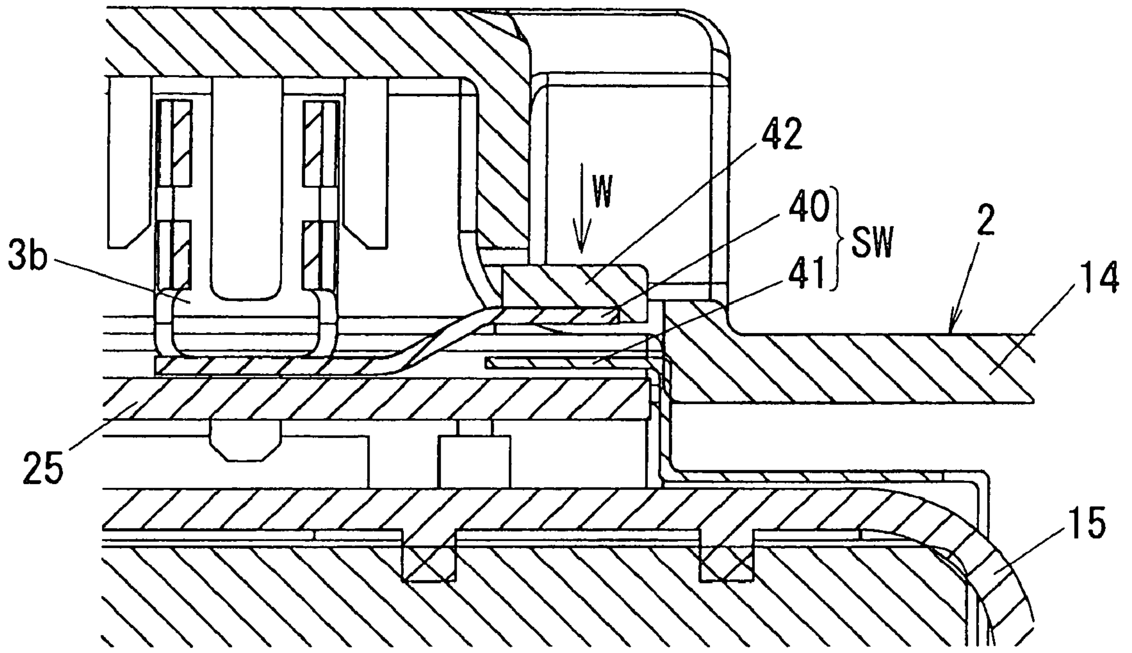
FIG. 11 offers a sectional view taken along line XI-XI of FIG. 10A.

In the fifth preferred embodiment illustrated in FIGS. 10 to 11, the batter pack 2 is preferably provided with a switch SW for switching a connection of a power supply line of the battery pack 2 during the inserting of the engaged portion 5 into the insertion restricting portion 4*a* of the engaging portion 4. In this embodiment, a thrust spring shaped contactor 40 is extended from the negative charging/discharging terminal 3*b* mounted on the printed circuit board 25 and a leading end of the contactor 40 is covered with molding products 42 made of an insulating material. The molding product 42 is provided at an inner portion of the engaging portion 4 or 4' (except the engaging portions 4" where the hook engaging portion 12*a* is provided) Further, when seen from the top, a part of the molding product 42 is exposed through the vertical hole C of the engaging portion 4 or 4', whereas the other part thereof is covered by the attachment securing portion 4*b* or $4b'$.

In such a configuration, if the engaged portions 5 or 5' of the power tool main body 1 are not inserted into the corresponding engaging portions 4' or 4", the contactor 40 does not get electrically connected with the sheet metal 41 connected to the cell 13. However, when the engaged portions 5 or 5' are inserted into the corresponding engaging portions 4 or 4' through the vertical holes C, the molding products 42 are pressed by the engaged portions 5 or 5' in a direction indicated by arrow "W" of FIG. 11. Accordingly, the molding products 42 move downward until top surfaces thereof become approximately horizontal with respect to a lower horizontal level of the engaging portion 4 or 4'. In such state, the contactor 40 becomes electrically connected to the sheet metal 41. Thereafter, the engaged portions 5 or 5' are inserted into the horizontal holes 7 or 8 to be engaged with the attachment securing portions 4*b* or $4b'$. In such state as well, the molding products 42 are pressed by the engaged portions 5 or 5', so that the top surfaces of the molding products 42 become approximately horizontal with respect to the bottom surfaces of the insertion restricting portions 4*a* or $4a'$. By electrically connecting/disconnecting the contactor 40 to the sheet metal 41, the power supply line of the battery pack 2 can be turned on/off. Further, when the battery pack 2 is not used, the terminals or the connecter signal lines can be prevented from being short-circuited, thereby improving the safety.

The installation structure of the battery pack 2 in accordance with the present invention can be widely applied to a battery pack having no connector.

The present invention can provide a convenient power tool capable of: easily attaching a battery pack to a power tool main body with one-touch operation; enabling an attachment/detachment in a limited space by reducing a distance the members involved are required to move for the attachment/detachment, compared to the conventional case requiring a slide insertion operation between slide rails and guide rails; and preventing other members from being damaged when an excessive separation force is applied during the detachment of the battery pack from the power tool main body.

While the invention has been shown and described with respect to the preferred embodiments, it will be understood by those skilled in the art that various changes and modification may be made without departing from the scope of the invention as defined in the following claims.

What is claimed is:

1. A power tool comprising:

a power tool main body having a motor, a reduction unit and an output unit; and a battery pack accommodating therein a battery, the battery pack being detachably attached to the power tool main body, wherein the battery pack is provided with an attaching portion having a positive and a negative terminal for connecting the battery to the power tool main body and at least two engaging portions to be mechanically coupled to the power tool main body, wherein the power tool main body is provided with an attached portion having a protruding engaged portion and one or more L-shaped engaged portions respectively corresponding to said at least two engaging portions of the battery pack respectively, wherein each of the engaging portions of the battery pack includes an insertion restricting portion and an attachment securing portion for allowing its corresponding engaged portion to be inserted only in a direction of pressing the attaching portion of the battery pack against the attached portion of the power tool main body, each of the attachment securing portions being coupled to its corresponding engaged portion, wherein at least one of said at least two engaging portions further has a hook engaging portion which is selectively secured with the protruding engaged portion moved from an insertion restricting portion of said at least one engaging portion to an attachment securing portion thereof, wherein each of the attachment securing portions is coupled to its corresponding engaged portion by shifting the battery pack toward a direction perpendicular to the direction of pressing the attaching portion against the attached portion of the power tool main body, and wherein each of the L-shaped engaged portions has a rib extended along said direction perpendicular to the direction of pressing the attaching portion of the battery pack against the attached portion of the power tool main body.

2. The power tool of claim 1, wherein said at least two engaging portions are separately provided at both sides of the attaching portion or entirely provided at one side thereof.

3. The power tool of claim 2, wherein the hook engaging portion is provided at a leading end portion of a rotatably supported hook, and a manipulated part for releasing an engagement between the hook engaging portion and the engaged portion is provided at a central portion of the hook.

4. The power tool of claim 2, wherein, among said at least two engaging portions, a horizontal distance between an insertion restricting portion of an engaging portion and its corresponding attachment securing portion is set differently from that between an insertion restricting portion of another engaging portion and its corresponding attachment securing portion, or a height of a horizontal part of an attachment securing portion of an engaging portion is set differently from that of a horizontal part of an attachment securing portion of another engaging portion.

5. The power tool of claim 4, wherein the horizontal distance and the height are set differently depending on a type of the battery pack, which is determined by a battery voltage.

6. The power tool of claim 1, wherein the hook engaging portion is provided at a leading end portion of a rotatably supported hook, and a manipulated part for releasing an engagement between the hook engaging portion and the engaged portion is provided at a central portion of the hook.

7. The power tool of claim 1, further comprising a switch provided at the battery pack, for selectively allowing an output of the battery to be electrically connected to the positive and the negative terminal, wherein the output of the battery is electrically connected to the positive and the negative terminal when an engaged portion is engaged with its corresponding engaging portion.

* * * * *